United States Patent
Max

(10) Patent No.: US 6,541,961 B1
(45) Date of Patent: Apr. 1, 2003

(54) METHOD AND APPARATUS FOR REDUCED TEMPERATURE DEPENDENT POSITION DETECTION

(75) Inventor: Erland Max, Västra Frölunda (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/959,818

(22) PCT Filed: May 18, 2000

(86) PCT No.: PCT/SE00/00983

§ 371 (c)(1),
(2), (4) Date: Jan. 28, 2002

(87) PCT Pub. No.: WO00/71977

PCT Pub. Date: Nov. 30, 2000

(30) Foreign Application Priority Data

May 24, 1999 (SE) .................................. 9901876

(51) Int. Cl.⁷ ............................ G01B 7/00; G01B 7/14; G01D 5/20; G01R 27/26
(52) U.S. Cl. ............................ 324/207.16; 324/207.12; 324/654; 336/45
(58) Field of Search ........................... 324/225, 207.12, 324/207.15–207.19, 207.24, 207.26, 654, 656; 123/90.11; 336/45, 130; 340/870.31–870.33

(56) References Cited

U.S. PATENT DOCUMENTS

| | | | |
|---|---|---|---|
| 3,891,918 A | | 6/1975 | Ellis |
| 4,649,341 A | * | 3/1987 | Ulbrich et al. ......... 324/207.16 |
| 5,332,966 A | * | 7/1994 | Berberich .............. 324/207.12 |
| 5,898,300 A | | 4/1999 | Heizmann et al. |
| 6,366,078 B1 | * | 4/2002 | Irle et al. ................ 324/207.17 |

FOREIGN PATENT DOCUMENTS

| | | |
|---|---|---|
| DE | A1-4118975 | 12/1992 |
| DE | A1-4313273 | 10/1994 |
| DE | A1-4318263 | 1/1995 |

* cited by examiner

Primary Examiner—Gerard R. Strecker
(74) Attorney, Agent, or Firm—Birch, Stewart, Kolasch & Birch, LLP

(57) ABSTRACT

The invention relates to a method for substantially temperature-independent detection of the position of a moving element (9) by way of an inductive position sensor (1), comprising a coil (5) and a core (4) movable within the coil, the position of said core in relation to the coil (5) being dependent on the position of said element (9), whereby a measurement of the inductance of said coil (5), corresponding to the core (4) position, is detected by connecting a voltage to said coil (5) and measuring the time period in which a current (i) through the coil (5) is changed between two predetermined levels. The method follows the steps of feeding a regularly alternating voltage to the coil (5), measuring the current (i) flowing through the coil (5), measuring the period of time ($t_1$) needed for the current (i) to change from a first predetermined level ($i_1$) to a second predetermined level ($i_2$), and determining a measurement of the core (4) position through measuring the period of time ($t_1$). Through the invention, an improved position detection is provided, primarily intended for automotive vehicle gearboxes, achieving a highly reduced temperature dependence.

8 Claims, 3 Drawing Sheets

METHOD AND APPARATUS FOR REDUCED TEMPERATURE DEPENDENT POSITION DETECTION

This application is the national phase under 35 U.S.C. § 371 of PCT International Application No. PCT/SE00/00983 which has an International filing date of May 18, 2000, which designated the United States of America and was published in English.

TECHNICAL FIELD

The present invention relates to a method for position detection. In particular, the invention will find its application in connection with automotive vehicles, and is intended to be a method for substantially temperature-independent detection of the position of a moving element in a drive line, e.g. a clutch or a gearbox control. The invention also relates to a device intended for such detection.

BACKGROUND ART

In many technical contexts, there exists a requirement for position sensors, for detecting and measuring the positions of various components. In connection with vehicles, for example heavy-duty trucks, position sensors are utilised in connection with the vehicle clutch and gearbox, for detection of the positions of moving components. For the vehicle clutch, the measured position value may be used for automatic control of the clutch, and for the gearbox, the measured position value may be used for confirmation of the engagement of a certain gear ratio.

A known type of gearbox comprises a so-called splitter ratio means, a main gearbox section and a range ratio means. The splitter ratio means is located closest to the clutch and functions as a full/half step ratio means. The main gearbox section is located in the middle and functions like a conventional gearbox for e.g. a passenger car. The range ratio means, finally, is located at the rear and functions like a range gearbox. Consequently, there is a requirement for being able to detect the position of the clutch, and of the splitter and the range ratio means, respectively, in an appropriate and efficient manner. In a drive line, the power take-off (PTO), differential brakes and other components might also need an accurate position sensor.

A previously known method for position detection is the use of an inductive type position sensor, which is a previously known type of sensor, generally comprising a coil and a magnetic core, movable inside the coil. The movable core is mechanically influenced by the component, the position of which is to be detected, causing the coil inductance to vary depending on the position of the core inside the coil.

With a prior art inductive position sensor, the position of a certain component can be detected in the following manner. A power supply is connected to the sensor coil, and a voltage pulse is sent through the coil. In accordance with known physical relationships, a magnetic field, depending on the magnitude of the current, is created around the coil. This in turn entails that an electromotive force (EMF), directed so as to counteract the current, will be created. This reverse voltage will be proportional to the current variation per unit of time. The proportionality factor is called the coil inductance, L, and is dependent of the design of the coil.

The magnitude of the current through the coil is in each instant determined by the voltage of the power source minus the reverse EMF. The current through the coil will therefore increase successively towards a final value, determined by the applied voltage and the resistance of the coil. Approximately, the magnitude of the current i through the coil will increase according to the relationship:

$$i = U/R \times (1 - e^{-(R/L)t})$$

where U is the voltage applied, R is the coil resistance and L is the coil inductance. In case the coil is provided with a moving core, the inductance L will vary with the position of the core. The time constant of the circuit has the value of L/R. After this period of time, the magnitude of the current has increased to $1-1/e$, which equals about 63% of the final value of the current.

In connection with the known inductive sensor, a voltage pulse will thus be applied across the sensor coil, causing the current to increase with time according to the discussion above. The inductance, and thereby also the time constant (i.e. L/R) of the current increase, will vary depending on the position to be measured, which in turn will depend on how far into the coil the core has been inserted.

The time it takes for the current to increase up to a predetermined value is measured and subsequently transformed into a corresponding core position. In accordance with known art, a voltage supply can be utilised wherein pulses rise up to a positive, constant value and then return to zero after a predetermined time. It is also previously known to utilise periodically recurring pulses.

Although this previously known position detection normally provides acceptable position detection, it exhibits a disadvantage in having a substantial temperature dependence. This will result in incorrect measurement signals, which is of course a problem. In order to resolve this problem, various methods for compensation of the temperature dependence can be used. According to known technique, the temperature dependence may for example be described mathematically and empirically, whereby a compensation for the temperature dependence may be performed by recalculation of measurement values. This will however involve the use of expensive extra equipment, which might furthermore be too complicated.

DISCLOSURE OF THE INVENTION

Thus, a primary object of the present invention is to solve the above problems and to provide an improved method for substantially temperature-independent position detection, especially of moving components in an automotive vehicle drive line. This is achieved by a method and associated device as discussed in accordance with the disclosed invention.

The invention is intended for detection of the position of a moving element by means of an inductive position sensor comprising a coil and a moving core inside the coil. The position of the core is dependent on the position of said element, whereby a measurement of the inductance of said coil, corresponding to the core position, is detected by connecting a voltage to said coil and measuring the time passing until a current through the coil reaches a predetermined level. According to the invention, a square wave voltage is fed to the coil, a measurement is made of the current flowing through the coil and of the time passing between the current rising from a first, predetermined level to a second, predetermined level. A measurement of the position of the core is obtained through said time period measurement. By selecting, according to the invention, appropriate current levels, the time, and thus the position determination, will be practically temperature-independent. Through this, an elimination of the temperature dependence in position detection will in substance be achieved without resorting to expensive auxiliary equipment for temperature compensation.

With the invention, high measurement accuracy will be achieved in environments where temperatures vary strongly with time and space. Furthermore, the invention can be embodied in the form of an inexpensive and robust sensor.

According to the invention, a relatively high frequency of said square wave voltage can be selected, allowing a large number of measurements to be performed and a mean value of said measurements to be calculated. This secures that temporary variations, e.g. due to vibrations of the position sensor, will not influence the measurements.

Advantageous embodiments are described in the subsequent, dependent claims.

DESCRIPTION OF THE DRAWINGS

The invention will be described below in connection with preferred embodiments and the enclosed drawings, in which.

PREFERRED EMBODIMENT

Figure 1:
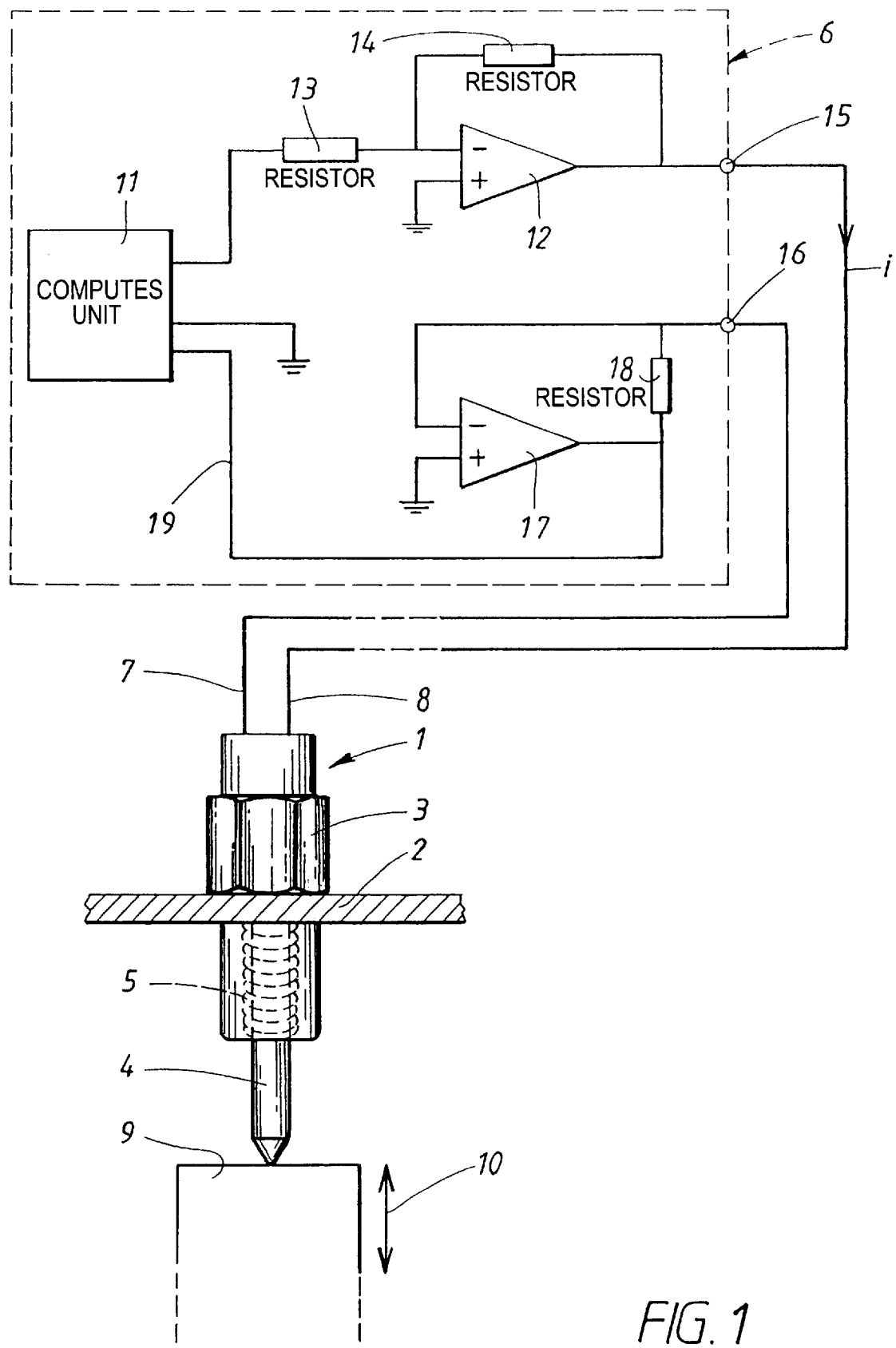
FIG. 1 illustrates, schematically and in partial cross-section, a position sensor and a control device that can be utilised according to the invention.

FIG. 1 shows a position sensor 1 that can be utilised in connection with the present invention. According to a preferred embodiment, the position sensor 1 is intended for use in connection with heavy-duty trucks, more particularly for position detection in a clutch or a gearbox of the vehicle. Consequently, the lower portion of the figure shows a side view, in partial cross-section, of a position sensor 1, arranged in a cover or casing 2, for example in such a clutch or gearbox. The position sensor 1 is arranged for attachment in a hole through the casing 2 by means of a screw 3. In this way, the position sensor 1 extends through said casing 2.

The position sensor 1 comprises a movable element in the form of a core 4, being arranged inside the casing 2 and movable within a coil 5 (indicated with dashed lines). The coil 5 is further connected to a separate measuring device 6, via two electrical connections 7, 8. The measuring device 6 and its function will be described in detail below. The invention is not limited to the circuit diagram illustrated in FIG. 1, but the measuring device 6 may be realised in other ways.

The position sensor 1 is of the inductive type, a type of sensor as such known. Further, the position sensor 1 is installed in the casing 2 in such a way that the core 4 can be mechanically influenced by an element 9, movable back and forth along the longitudinal direction of the core 4, as indicated by an arrow 10. In the applications suitable for the invention, the element 9 may in reality consist of, for example, a shaft, a piston rod or a sleeve. The invention is however not limited to these examples, but may be applied also with other components. Preferably, the element 9 is arranged so as to allow displacement back and forth for a certain distance, which may for example lie within a range between a few millimetres and up to a few hundred millimetres. According to what was discussed initially, the inductance of the coil 5 will vary according to how far into the coil 5 the core is displaced. The position of the core 4 is in turn dependent of the position of the element 9 along the longitudinal direction of the core 4. In the following will be described how a measure of the inductance, and thereby of the position of the element 9, can be determined according to the invention.

The position sensor 1 is, as was mentioned above, connected to a measuring device 6. Said device includes a computer unit 11 arranged for control and measurement in connection with position detection. To this end, the computer unit 11 is functioning to drive a first operational amplifier 12, via a resistor 13 connected to the negative input of the operational amplifier 12, causing a square wave voltage to appear at the output of the operational amplifier 12. The output of the operational amplifier 12 is hereby fed back to its negative input via a further resistor 14. The square wave voltage is output at a connection 15 and fed through the coil 5. Preferably, the square wave voltage has a frequency lying in the range between 2 Hz and 2 kHz.

According to what was explained above, the voltage across the coil 5 will cause a current i that will vary with time. The current i can be measured, by the coil 5 also being connected to a second connection 16 of the measuring device 6. This connection 16 is connected to a second operational amplifier 17, which, according to the embodiment, is connected as a current-voltage converter, with a resistor 18 between the output of the operational amplifier 17 and its negative input. The output of the operational amplifier 17 is further connected to an input of the computer unit 11, via an electrical connection 19. The measurement current i is fed to the connection 16, and according to previously known relationships, the potential at the output of the second operational amplifier 17 will be substantially equal to the reverse sign of the current i, multiplied by the resistance of the resistor 18. This voltage can be detected in the computer unit 11, through which a value of the current i can be determined.

A basic thought behind the invention is that the period of time $t_1$, needed for the current to rise from a first level $i_1$ to a second level $i_2$, is measured. This measured time period will provide a measure of the position of the core 4, because the inductance of the coil 5 (and thereby the time constant L/R for the change in the current i) will vary in dependence of how far into the coil 5 the core 4 has been inserted.

Figure 2:
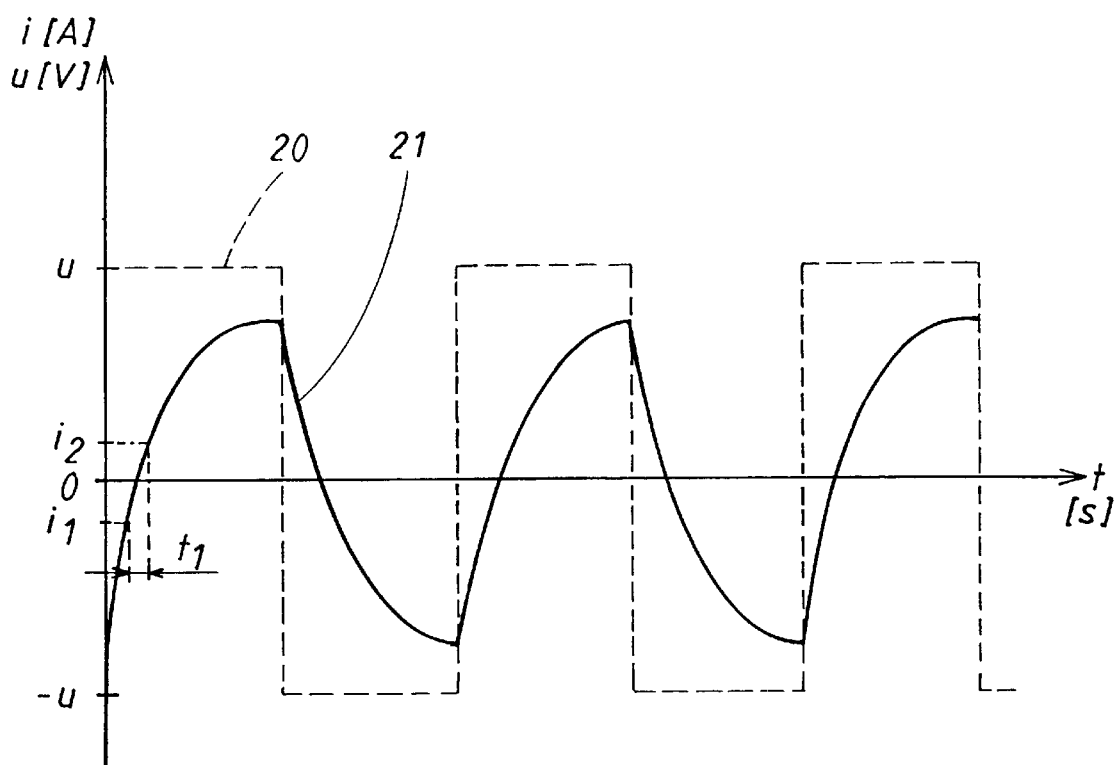
FIG. 2 shows a voltage and current diagram, illustrating the function of the invention.

In FIG. 2, the function of the invention is illustrated by means of current and voltage diagrams. The above-mentioned square wave voltage delivered by the first operational amplifier is illustrated by a dashed line 20. According to the embodiment, the square wave voltage is selected to be symmetrical about 0 V and to vary between two values, U and −U, respectively. The current i through the coil 5 is illustrated by a continuous line 21. When the square wave voltage changes polarity, the time derivative of the current i will change sign, and the current will change at a certain rate, depending on the inductance. The inductance, in turn, will depend on how far into the coil 5 the core 4 has been inserted. The inductance of the coil 5, and thereby the position of the element 9, can be determined by the computer unit 11 (see FIG. 1) measuring the period of time $t_1$ needed for the current i to change from a first value $i_1$ to a second value $i_2$.

As the core is magnetised by means of a symmetrical alternating voltage (e.g. a square wave voltage) across the coil, a symmetrical magnetising curve/hysteresis curve is obtained (the magnetic field B as a function of N×i, where N is the number of turns of the coil). The inclination of this curve determines the instantaneous inductance of the coil (at each point of the curve). The magnetising curve exhibits the advantageous characteristic of the instantaneous inductance being relatively uninfluenced by the temperature, where the current i is close to zero. Furthermore, the influence from the coil resistance (and thereby its temperature dependence) will be small, as the current through it is small.

In order to obtain accurate measurements, the measuring time $t_1$ should be as long as possible, and, consequently, the two current levels $i_1$, $i_2$, are selected as far apart as possible. The optimum current level values will have to be tried out from case to case, and are usually not located symmetrically about zero.

The magnetic properties of the magnetic core are non-linear and temperature-dependent. When a magnetising curve is run through, energy is needed, which can be seen partly as a loss resistance connected in series with the coil resistance. Together with the temperature dependence of the coil resistance, the total temperature dependence will become complex, particularly if the core and the coil will receive different temperatures, e.g. during transients.

A basic thought behind the present invention is based on the realisation that a low temperature dependence will be obtained if the current levels $i_1$, and $i_2$ are selected closely enough to zero. This is due to a. o. the fact that the resistance of the coil 5 will not influence the time derivative of the current i at a current i close to zero. More particularly, this is due to the magnetic properties of the core 4, and the so-called series resistances occurring in the coil 5 and the core 4, will have little influence at low currents if, at the same time, the condition of symmetrical magnetisation is fulfilled through symmetrical voltage feeding. According to the invention, the current levels $i_1$ and $i_2$ are thus selected to lie within an interval close to zero, exhibiting a low temperature dependence.

Figure 3:
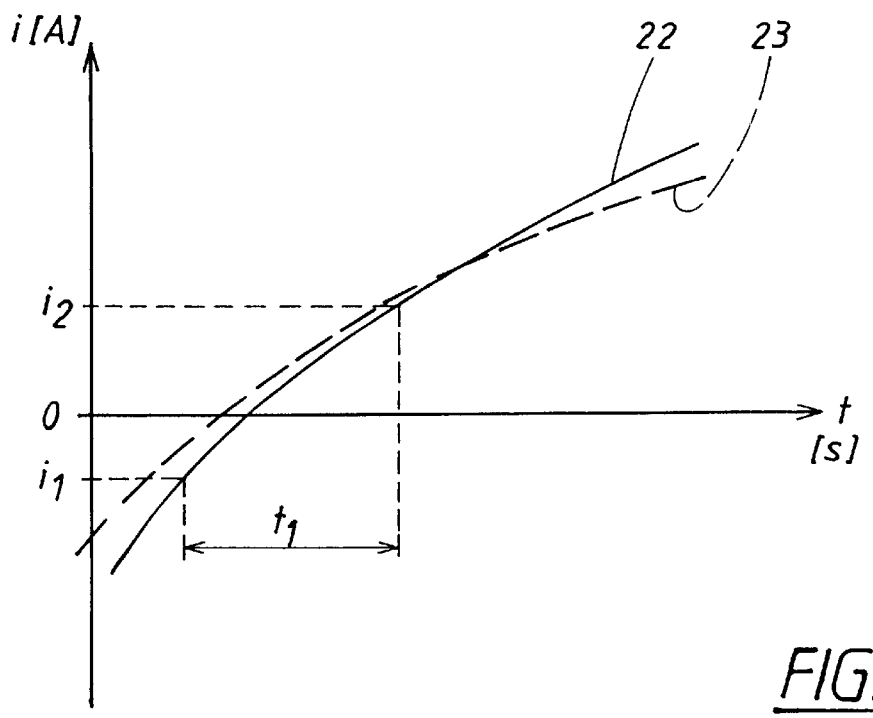
FIG. 3 shows two current curves, corresponding to two different temperatures.

FIG. 3 shows in further detail how the current levels, $i_1$, $i_2$, can be selected. The figure is an enlarged portion of the diagram of FIG. 2 and shows two current curves that are both of the type shown in FIG. 2, but where one current curve 22 shows the current in case the position sensor is working at a relatively low temperature (e.g. 25° C.) and the other current curve 23 shows the current when the position sensor has a relatively high temperature (e.g. 105° C.). As a consequence of the temperature dependence described above it applies that the two curves 22, 23 will appear somewhat different.

During position detection according to the invention, the computer unit 11 will measure the time $t_1$ needed for the current i to pass from the first current value $i_1$ to the second current value $i_2$. In FIG. 3, that period of time $t_1$ is indicated, which will pass while the current curve 22 (corresponding to a relatively low temperature) runs between the two levels $i_1$, $i_2$.

Figure 4:
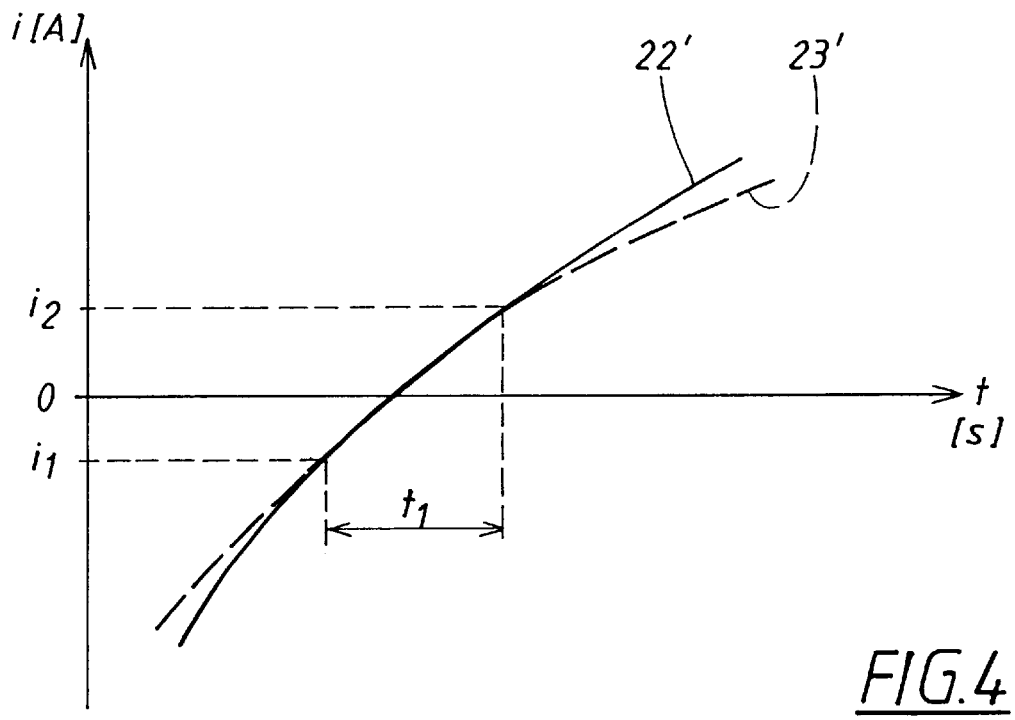
FIG. 4 shows two current curves, illustrating how a temperature compensation during measurements can be performed according to the invention.

FIG. 4 shows in detail how current levels, $i_1$, $i_2$, are selected in the present invention. The figure shows current curve 22' and current curve 23', comparable to curves 22 and 23 in FIG. 3, respectively, but delayed in time to overlap at low current levels. In the case of the present invention, period of time $t_1$ will pass while the current curve 22' runs between the two levels $i_1$, $i_2$.

Figure 5:
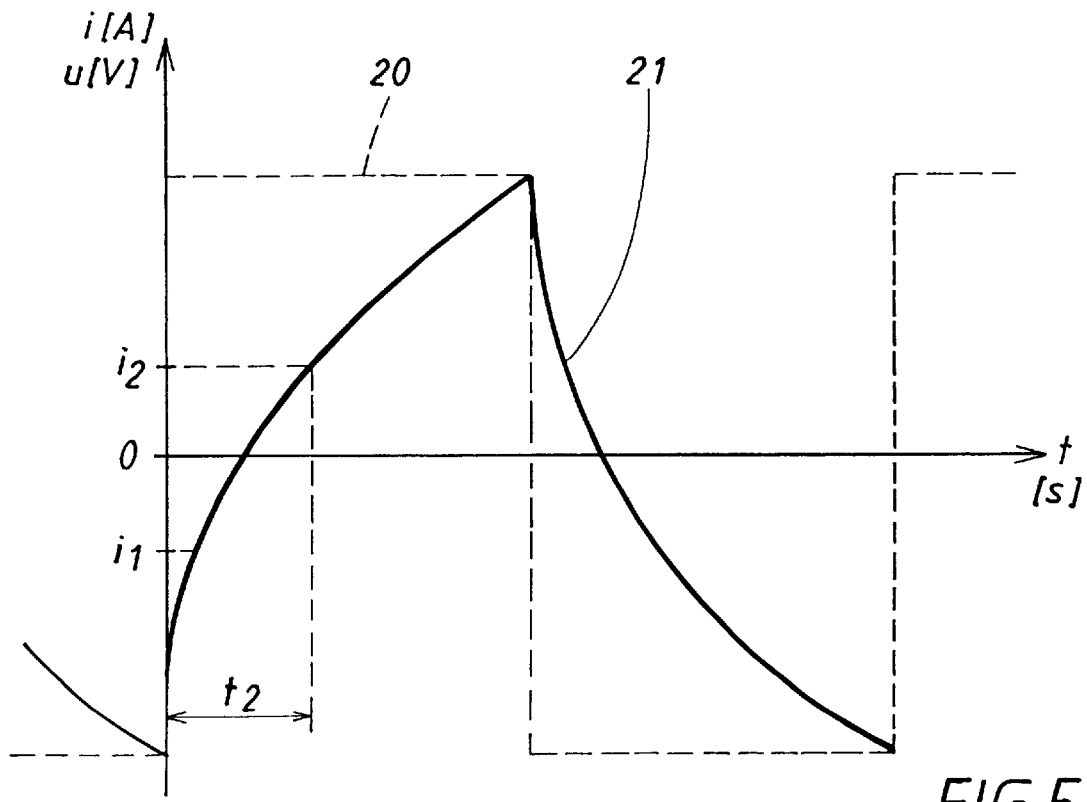
FIG. 5 shows a voltage and current diagram according to an alternative embodiment.

According to an alternative embodiment, described with reference to FIG. 5, the length of a period of time $t_2$ passing from when the square wave voltage switches over and changes polarity until one of the current levels is reached, can be utilised as a measurement of the temperature. If required, a further refined temperature compensation can therefore be performed in addition to what has been described above, more particularly through an additional calculated compensation.

Furthermore, the method according to the invention can be used for calculating the mean value of the results from a large number of measurements of the time $t_1$. This is enabled by the square wave voltage having a relatively high frequency, in the order of 250 Hz. For this purpose, the computer unit 11 is operable to determine a mean value of for example 10 or 50 measurements of the current position of the element 9. The advantage of this method is that any influence from occasional deviations of the position of the element 9, for example caused by vibrations or transient movements, can be eliminated.

The invention will not be limited to what has been described above, but various embodiments are conceivable within the scope of the claims. For example, the measurement method is suitable for use in many different applications, e.g. for detecting the positions of various components in a vehicle drive line or other industrial products. Furthermore, square wave voltages with various frequencies and duty cycles may be used. For example, the invention is not limited to using a supply voltage with a time-symmetrical square wave shape, but other waveforms are also conceivable.

What is claimed is:

1. A method for substantially temperature-independent detection of the position of a moving element by means of an inductive position sensor, comprising a coil and a core movable within the coil, the position of said core in relation to the coil being dependent on the position of said element, whereby a measurement of the inductance of said coil, corresponding to the core position, is detected by connecting a voltage to said coil and measuring the time period in which a current (i) through the coil is changed between two predetermined levels, comprising the following steps:

feeding a regularly alternating voltage to the coil, measuring the current (i) flowing through the coil, measuring the period of time ($t_1$) needed for said current (i) to change from a first predetermined level ($i_1$) to a second predetermined level ($i_2$), which predetermined levels ($i_1$, $i_2$) are chosen so that a minimal temperature dependency is reached, and determining a measurement of the core position through measuring said period of time ($t_1$).

2. The method according to claim 1, wherein said levels ($i_1$, $i_2$) being selected within such an interval that the measurement of said time ($t_1$) will result in minimum temperature dependence.

3. The method according to claim 2, wherein said levels ($i_1$, $i_2$) being selected close to zero.

4. The method according to claim 2 or 3, wherein said alternating voltage being a square wave voltage.

5. A method according to claim 4, wherein said square wave voltage being selected symmetrically so as to alternate between two voltage levels lying symmetrically about 0 V.

6. A method according to claim 4, wherein said square wave voltage having a frequency between 2 Hz and 2 kHz.

7. A method according to claim 4, further comprising utilising a large number of measurements of said time ($t_1$) for determining a mean value of said time ($t_1$).

8. A device for substantially temperature-independent detection of the position of a moving element, comprising an inductive position sensor, including a coil and a core movable within the coil, the position of said core in relation to the coil being dependent on the position of said element, and comprising a measuring device for feeding a voltage through the coil, for measuring the current (i) through the coil and for measuring the time period between the points in time when the current (i) through the coil passes two predetermined levels, whereby a measurement of the inductance of said coil, corresponding to the core position, is derived from said time measurement, wherein said measuring device comprising an amplifier means for feeding a regularly alternating voltage through said coil, and said measuring device functioning to measure the period of time ($t_1$) needed for said current (i) to change from a first predetermined level ($i_1$) to a second predetermined level ($i_2$), which predetermined levels ($i_1$, $i_2$) are chosen so that a minimal temperature dependency is reach, said period of time ($t_1$) being used for determining a measurement of the core position.

* * * * *